(12) United States Patent
Tajima et al.

(10) Patent No.: US 7,899,183 B2
(45) Date of Patent: Mar. 1, 2011

(54) RANDOM NUMBER GENERATING AND SHARING SYSTEM, ENCRYPTED COMMUNICATION APPARATUS, AND RANDOM NUMBER GENERATING AND SHARING METHOD FOR USE THEREIN

(75) Inventors: Akio Tajima, Minato-ku (JP); Shuji Suzuki, Minato-ku (JP)

(73) Assignee: NEC Corporation, Tokyo (JP)

( * ) Notice: Subject to any disclaimer, the term of this patent is extended or adjusted under 35 U.S.C. 154(b) by 1042 days.

(21) Appl. No.: 11/043,232

(22) Filed: Jan. 27, 2005

(65) Prior Publication Data

US 2005/0172129 A1 Aug. 4, 2005

(30) Foreign Application Priority Data

Jan. 29, 2004 (JP) .............................. 2004-020618

(51) Int. Cl.
*H04L 9/32* (2006.01)
(52) U.S. Cl. ...................... 380/263; 713/168; 713/169; 380/255; 380/264
(58) Field of Classification Search .................. None
See application file for complete search history.

(56) References Cited

U.S. PATENT DOCUMENTS

| | | | | |
|---|---|---|---|---|
| 4,897,875 A | * | 1/1990 | Pollard et al. ................ | 713/168 |
| 5,345,506 A | * | 9/1994 | Tsubakiyama et al. ....... | 713/171 |
| 5,473,689 A | * | 12/1995 | Eberhard ..................... | 713/169 |
| 5,799,085 A | * | 8/1998 | Shona ......................... | 713/169 |
| 6,028,937 A | * | 2/2000 | Tatebayashi et al. ......... | 713/169 |
| 6,438,234 B1 | * | 8/2002 | Gisin et al. .................. | 380/256 |
| 7,245,722 B2 | * | 7/2007 | Hirota et al. ................. | 380/256 |
| 2003/0188195 A1 | * | 10/2003 | Abdo et al. .................. | 713/201 |
| 2003/0188242 A1 | * | 10/2003 | Ishizuka et al. ............. | 714/727 |

FOREIGN PATENT DOCUMENTS

| | | |
|---|---|---|
| JP | H01-165241 A | 6/1989 |
| JP | H04-006925 A | 1/1992 |
| JP | H05-075598 A | 3/1993 |
| JP | 2000-174747 A | 6/2000 |
| JP | 2000-286841 A | 10/2000 |
| JP | 2001-94554 A | 4/2001 |
| JP | 2001-325227 A | 11/2001 |
| JP | 2003-249928 A | 9/2003 |
| JP | 2003-318881 A | 11/2003 |

OTHER PUBLICATIONS

Lo et al, "Unconditional Security of Quantum Key Distribution over Arbitrarily Long Distances", Science Magazine, vol. 283 No. 5410, pp. 2050-2056, printed from http://www.sciencemag.org/cgi/content/full/sci;283/5410/2050 on Sep. 4, 2008.*

* cited by examiner

*Primary Examiner* — Ponnoreay Pich
(74) *Attorney, Agent, or Firm* — Sughrue Mion, PLLC

(57) ABSTRACT

A sender's encrypted communication apparatus and a recipient's encrypted communication apparatus autonomously generate keys for encryption with respective key generators, store the generated encryption keys in respective encryption key memories, and store part of the generated encryption keys in respective authentication memories. The keys stored in the authentication memories are used for mutual authentication when the sender's encrypted communication apparatus and a recipient's encrypted communication apparatus are connected to each other.

42 Claims, 10 Drawing Sheets

(a)

(b)

RANDOM NUMBER GENERATING AND SHARING SYSTEM, ENCRYPTED COMMUNICATION APPARATUS, AND RANDOM NUMBER GENERATING AND SHARING METHOD FOR USE THEREIN

BACKGROUND OF THE INVENTION

1. Field of the Invention

The present invention relates to a random number generating and sharing system, an encrypted communication apparatus, and a random number generating and sharing method for use therein, and more particularly to a method of mutually authenticating parties concerned in a quantum encryption key distribution system for distributing a key in a common encryption key communication system.

2. Description of the Related Art

In a quantum encryption key distribution system, a sender terminal and a recipient terminal can safely generate and share a random number (encryption key) therebetween. Specifically, the quantum encryption key distribution system distributes an encryption key according to a process described below (see, for example, Japanese laid-open patent publication No. 2003-249928).

(1) When random number information is sent in the form of a light signal from a sender terminal to a recipient terminal, it is sent such that the number of photons per bit is 1. (2) If an eavesdropper inserts a branch connection between the sender terminal and the recipient terminal and peeps at the random number information, then photons sent from the sender terminal are branched and seized by the eavesdropper, and do not reach the recipient terminal.

(3) The recipient terminal can then detect the interception because it does not receive the light signal represented by the branched photons. (4) Bits that can be shared by the sender terminal and the recipient terminal are bits that have not been wiretapped. The sender terminal and the recipient terminal can safely generate and share a random number (encryption key) therebetween.

Heretofore, it has been the general practice for an encrypted communication apparatus to update a key (working key) for encrypting data for increased safety. When a working key is updated, it is important that its information should not be known to the other people.

Consequently, a working key is either encrypted by another encryption key (master key) and then sent, or manually updated. A master key is set up either manually or by a public encryption key, and distributed. If such a public encryption key is used, then it is necessary to authenticate the public encryption key.

Unlike the above encrypted communication apparatus, the quantum encryption key distribution system automatically generates and shares an encryption key autonomously between each pair of sender and recipient terminals. Therefore, the quantum encryption key distribution system does not need a process carried out by a third party, such as the manual setup of an encryption key or the authentication of a public encryption key which is performed by the conventional encrypted communication apparatus.

While the conventional quantum encryption key distribution system makes it possible to safely generate and share an encryption key between sender and recipient terminals, it is necessary to start generating and sharing an encryption key after it is confirmed that each of the sender and recipient terminals is connected to a proper party.

For example, as shown in FIG. 1 of the accompanying drawings, if a malicious party connects a false terminal to a sender terminal, e.g., false recipient terminal 9b to normal sender terminal 8a in FIG. 1, then an encryption key is generated and shared by the false terminal and the sender terminal, and known to the malicious party, unless a legitimate connection is confirmed.

Since the conventional quantum encryption key distribution system is at risk of having encrypted data wiretapped and decrypted using a seized encryption key, an encryption key needs to start being generated and shared after each of the sender and recipient terminals confirms that it is connected to a proper party. However, the conventional quantum encryption key distribution system is problematic in that it has no mechanism for confirming that each of the sender and recipient terminals is connected to a proper party.

FIG. 2A of the accompanying drawings shows a system made up of a normal sender terminal 8a and a normal recipient terminal 9b that are connected to each other. When a malicious party cuts off the normal transmission path of the system at two locations (A1, A2), the system can recognize that the transmission path is cut off, but is unable to recognize that it is cut off at the two locations.

Therefore, while the maintenance person is repairing one (A1 in FIG. 2A) of the two cut-off sites, as shown in FIG. 2B of the accompanying drawings, the malicious party can insert false recipient terminal 9b and false sender terminal 8b into the other cut-off site (A2 in FIG. 2A).

It is possible to detect the insertion of such false terminals by adding a check bit to a generated key. However, the probability that the insertion of false terminals is overlooked is not nil.

Moreover, inasmuch as some time is required until a false terminal is detected, a generated key may possibly be stolen before the false terminal is detected. The system is free of the above problems if it has a mechanism for confirming that each of the sender and recipient terminals is connected to a proper party and the companion party can be confirmed before an encryption key is generated. However, as described above, the conventional quantum encryption key distribution system does not have such a mechanism for confirming that each of the sender and recipient terminals is connected to a proper party.

SUMMARY OF THE INVENTION

It is therefore an object of the present invention to provide a random number generating and sharing system, an encrypted communication apparatus, and a random number generating and sharing method for allowing each of sender and recipient terminals to confirm that it is connected to a proper party, for thereby preventing an encryption key from being wiretapped by a connected false terminal and also preventing encrypted data from being decrypted by a wiretapped encryption key, and safely generating and sharing an encryption key and performing encrypted communications safely.

According to the present invention, there is provided a random number generating and sharing system for generating and sharing a random number between a sender terminal and a recipient terminal, comprising holding means for holding part of a random number generated and shared in the past between the sender terminal and the recipient terminal, wherein when the sender terminal and the recipient terminal which have been disconnected are connected again to each other, each of the sender terminal and the recipient terminal confirms the part of random number held by the holding means.

According to the present invention, there is also provided a random number generating and sharing system for generating and sharing a random number between a sender terminal and a recipient terminal and using the random number as an encryption key, comprising holding means for holding part of a random number generated and shared in the past between the sender terminal and the recipient terminal, wherein when the sender terminal and the recipient terminal which have been disconnected are connected again to each other, each of the sender terminal and the recipient terminal confirms the part of random number held by the holding means, and the generation of the encryption key is resumed when each of the sender terminal and the recipient terminal confirms the part of random number.

According to the present invention, there is further provided an encrypted communication apparatus for generating and sharing a random number between a sender terminal and a recipient terminal and using the random number as an encryption key for encrypted communications, comprising holding means for holding part of a random number generated and shared in the past between the sender terminal and the recipient terminal, wherein when the sender terminal and the recipient terminal which have been disconnected are connected again to each other, each of the sender terminal and the recipient terminal confirms the part of random number held by the holding means, and the generation of the encryption key and the encrypted communications using the encryption key are resumed when each of the sender terminal and the recipient terminal confirms the part of random number.

According to the present invention, there is provided a method of generating and sharing a random number between a sender terminal and a recipient terminal, comprising the steps of holding part of a random number generated and shared in the past between the sender terminal and the recipient terminal, with holding means, and when the sender terminal and the recipient terminal which have been disconnected are connected again to each other, confirming the part of random number held by the holding means with each of the sender terminal and the recipient terminal.

According to the present invention, there is also provided a method of generating and sharing a random number between a sender terminal and a recipient terminal and using the random number as an encryption key, comprising the steps of holding part of a random number generated and shared in the past between the sender terminal and the recipient terminal, with holding means, and when the sender terminal and the recipient terminal which have been disconnected are connected again to each other, confirming the part of random number held by the holding means with each of the sender terminal and the recipient terminal, and resuming the generation of the encryption key when the part of random number is confirmed by each of the sender terminal and the recipient terminal.

Specifically, in a first random number generating and sharing system according to the present invention for generating and sharing a random number between a sender terminal and a recipient terminal, part of a random number generated and shared in the past between the sender terminal and the recipient terminal is stored in a memory, and when the sender terminal and the recipient terminal which have been disconnected are connected again to each other, each of the sender terminal and the recipient terminal confirms the part of random number held in the memory.

With a second random number generating and sharing system according to the present invention, in the first random number generating and sharing system, a quantum encryption key distribution system is used for generating and sharing the random number.

With a third random number generating and sharing system according to the present invention, in the second random number generating and sharing system, the quantum encryption key distribution system comprises a "plug & play" system.

With a fourth random number generating and sharing system according to the present invention, in the second or third random number generating and sharing system, the quantum encryption key distribution system generates and shares the random number according to the BB84 (Bennett Brassard 84) protocol.

With a fifth random number generating and sharing system according to the present invention, in any one of the first through fourth random number generating and sharing systems, the sender terminal generates and shares random numbers between itself and a plurality of the recipient terminals.

In a sixth random number generating and sharing system according to the present invention for generating and sharing a random number between a sender terminal and a recipient terminal and using the random number as an encryption key, part of a random number generated and shared in the past between the sender terminal and the recipient terminal is stored in a memory, and when the sender terminal and the recipient terminal which have been disconnected are connected again to each other, each of the sender terminal and the recipient terminal confirms the part of random number held by the holding means, and the generation of the encryption key is resumed when each of the sender terminal and the recipient terminal confirms the part of random number.

With a seventh random number generating and sharing system according to the present invention, in the sixth random number generating and sharing system, a quantum encryption key distribution system is used for generating and sharing the encryption key.

With an eighth random number generating and sharing system according to the present invention, in the seventh random number generating and sharing system, the quantum encryption key distribution system comprises a "plug & play" system.

With a ninth random number generating and sharing system according to the present invention, in the seventh or eighth random number generating and sharing system, the quantum encryption key distribution system generates and shares the encryption key according to the BB84 protocol.

With a tenth random number generating and sharing system according to the present invention, in any one of the sixth through ninth random number generating and sharing systems, the sender terminal generates and shares encryption keys between itself and a plurality of the recipient terminals.

In a first encrypted communication apparatus for generating and sharing a random number between a sender terminal and a recipient terminal and using the random number as an encryption key for encrypted communications, part of a random number generated and shared in the past between the sender terminal and the recipient terminal is stored in a memory, and when the sender terminal and the recipient terminal which have been disconnected are connected again to each other, each of the sender terminal and the recipient terminal confirms the part of random number stored in the memory, and the generation of the encryption key and the encrypted communications using the encryption key are resumed when each of the sender terminal and the recipient terminal confirms the part of random numbeWith a second encrypted communication apparatus according to the present invention, in the first encrypted communication apparatus, a quantum encryption key distribution system is used for generating and sharing the encryption key.

With a third encrypted communication apparatus according to the present invention, in the second encrypted communication apparatus, the quantum encryption key distribution system comprises a "plug & play" system.

With a fourth encrypted communication apparatus according to the present invention, in the second or third encrypted communication apparatus, the quantum encryption key distribution system generates and shares the encryption key according to the BB84 protocol.

With a fifth encrypted communication apparatus according to the present invention, in any one of the first through fourth encrypted communication apparatus, the sender terminal generates and shares random numbers between itself and a plurality of the recipient terminals.

According to the present invention, therefore, in generating and sharing encryption keys, it is possible to confirm whether each of the sender terminal and the recipient terminal is connected to a normal party or not. It is thus possible to prevent an encryption key from being wiretapped by a connected false terminal and also to prevent encrypted data from being decrypted by a wiretapped encryption key. Consequently, an encryption key can safely be generated and shared, and encrypted communications can safely be performed.

According to the present invention, which is arranged and operated as described below, it is possible to confirm whether each of the sender terminal and the recipient terminal is connected to a normal party or not. It is thus possible to prevent an encryption key from being wiretapped by a connected false terminal and also to prevent encrypted data from being decrypted by a wiretapped encryption key. Consequently, an encryption key can safely be generated and shared, and encrypted communications can safely be performed.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 3:
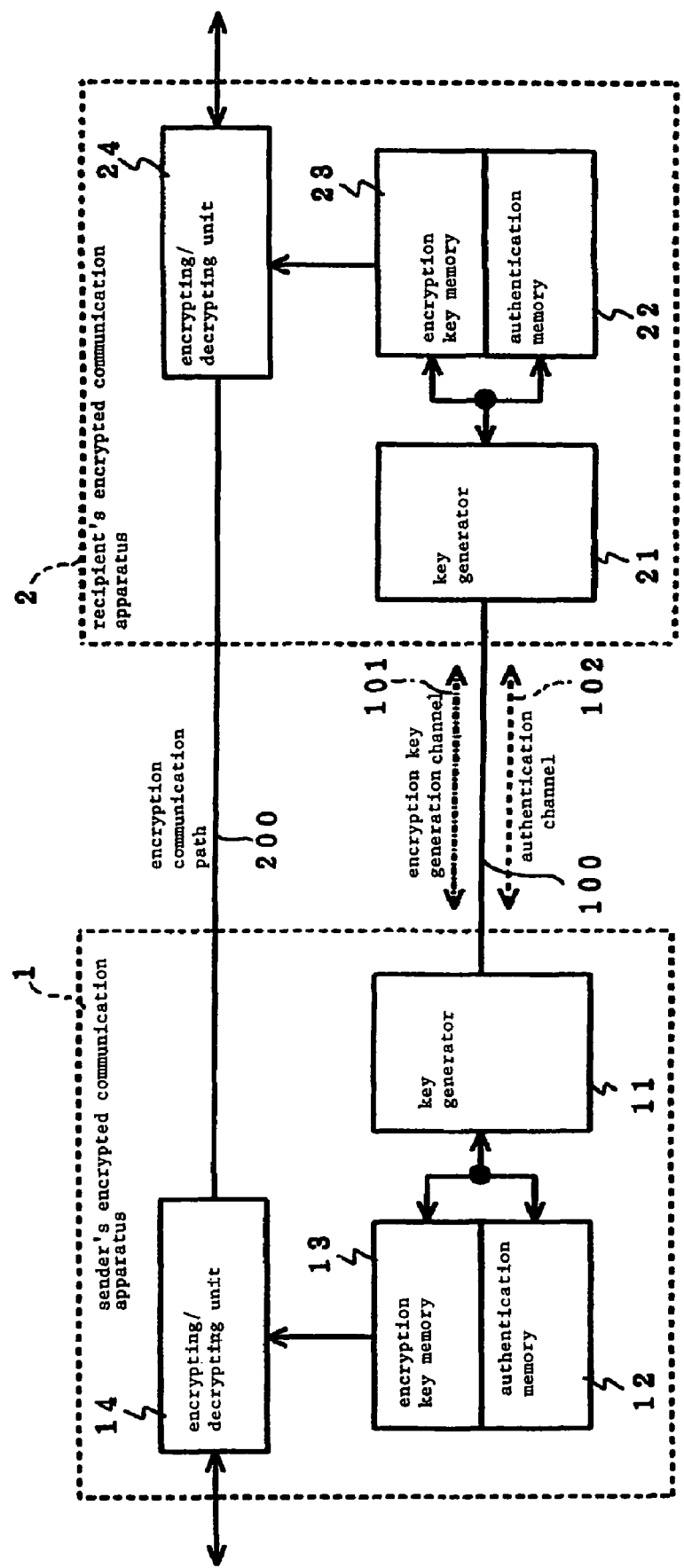
FIG. 3 is a block diagram of a random number generating and sharing system according to a first embodiment of the present invention.

FIG. 3 shows in block form a random number generating and sharing system according to a first embodiment of the present invention. As shown in FIG. 3, the random number generating and sharing system according to the first embodiment comprises sender's encrypted communication apparatus (hereinafter referred to as sender terminal) 1 and recipient's encrypted communication apparatus (hereinafter referred to as recipient terminal) 2.

Sender terminal 1 comprises key generator 11, authentication memory 12, encryption key memory 13, and encrypting/decrypting unit 14. Recipient terminal 2 comprises key generator 21, authentication memory 22, encryption key memory 23, and encrypting/decrypting unit 24.

Sender terminal 1 and recipient terminal 2 are connected to each other by encryption key generation/transmission path 100 and encryption communication path 200. Encryption key generation/transmission path 100 comprises encryption key generation channel 101 and authentication channel 102. Encryption communication path 200 interconnects encrypting/decrypting units 14, 24.

Figure 4:
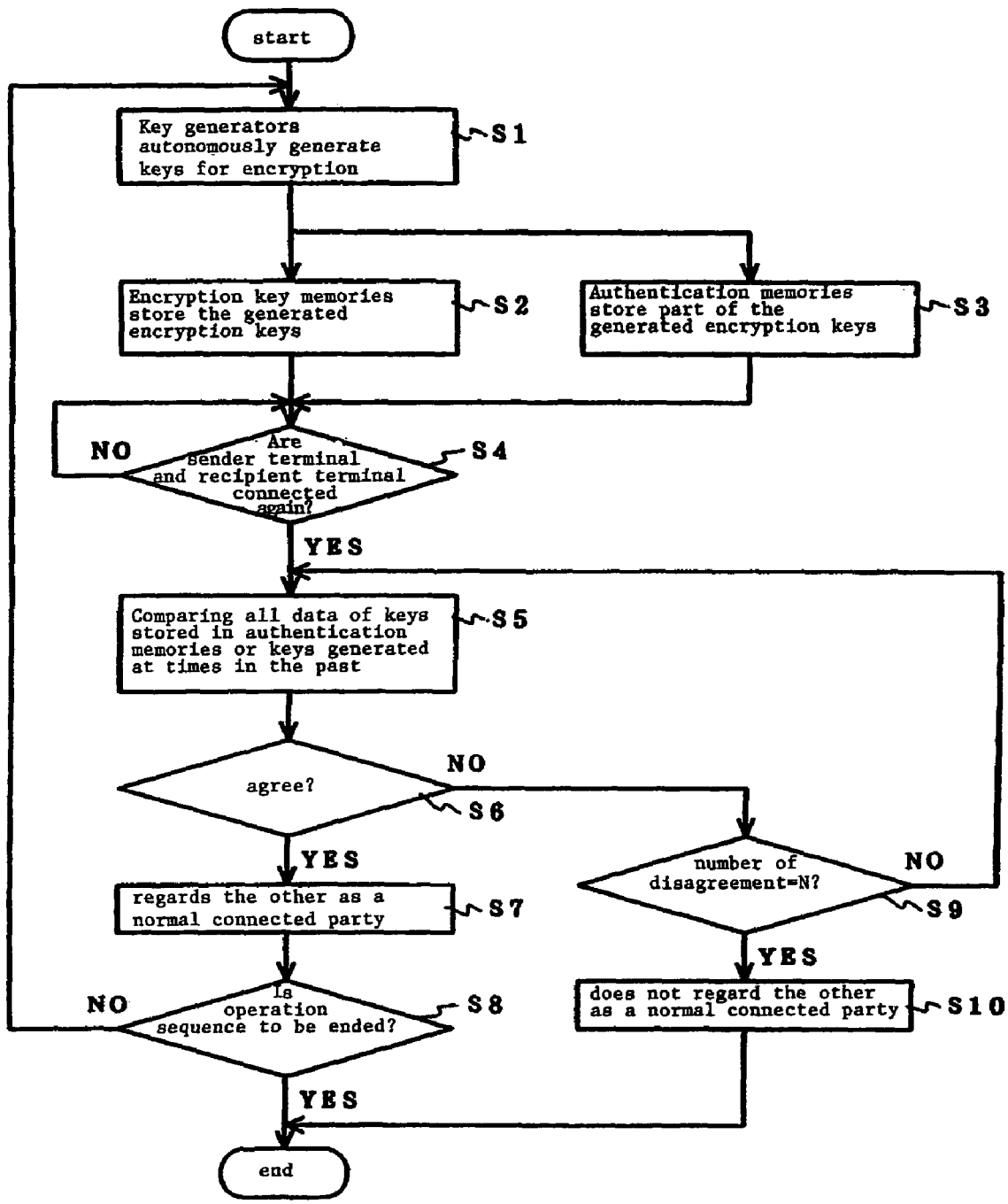
FIG. 4 is a flowchart of an operation sequence of a sender terminal and a recipient terminal of the random number generating and sharing system shown in FIG. 3.

FIG. 4 shows an operation sequence of sender terminal 1 and recipient terminal 2 of the random number generating and sharing system shown in FIG. 3. An encryption key generating process and a mutual authenticating process performed by sender terminal 1 and recipient terminal 2 will be described below with reference to FIGS. 3 and 4.

Key generators 11, 21 of sender terminal 1 and recipient terminal 2 autonomously generate keys for encryption in step S1 shown in FIG. 4. Encryption key memories 13, 23 store the generated encryption keys in step S2. Authentication memories 12, 22 store part of the generated encryption keys in step S3.

The encryption keys are generated through encryption key generation channel 101. The generated encryption keys are stored in encryption key memories 13, 23 and authentication memories 12, 22 with some regularity according to a predetermined process (e.g., nine out of ten generated encryption keys are used for encryption and the remaining one for authentication).

The encryption keys stored in encryption key memories 13, 23 are used to encrypt and decrypt data in encrypting/decrypting units 14, 24. Encrypted communications based on the encrypted data are performed through encryption communication path 200.

Part of the encryption keys stored in authentication memories 12, 22 is used for sender terminal 1 and recipient terminal 2 to authenticate each other through authentication channel 102 when sender terminal 1 and recipient terminal 2 are connected again in step S4. The mutual authentication of sender terminal 1 and recipient terminal 2 is performed by sending an encryption key from sender terminal 1 to recipient terminal 2 and sending an encryption key from recipient terminal 2 to sender terminal 1.

Sender terminal 1 and recipient terminal 2 are mutually authenticated by comparing all data of keys stored in authentication memories 12, 22 or keys generated at times in the past in step S5. If the compared key data agree with each other in step S6, each of sender terminal 1 and recipient terminal 2 regards the other as a normal connected party in step S7. If the operation sequence is to be ended in step S8, then the operation sequence is put to an end. If the compared key data do not agree with each other N times in steps S6, S9, then each of sender terminal 1 and recipient terminal 2 does not regard the other as a normal connected party in step S10. Thereafter, the operation sequence is put to an end.

Figure 1:
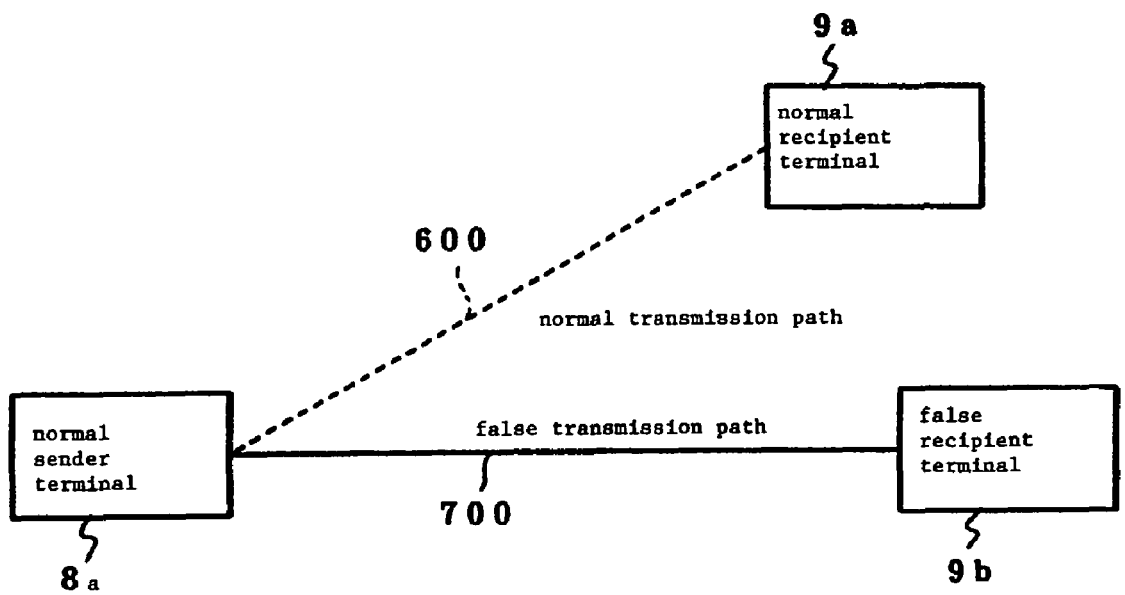
FIG. 1 is a block diagram of a conventional random number generating and sharing system with a false recipient terminal connected thereto.
Figure 2A:
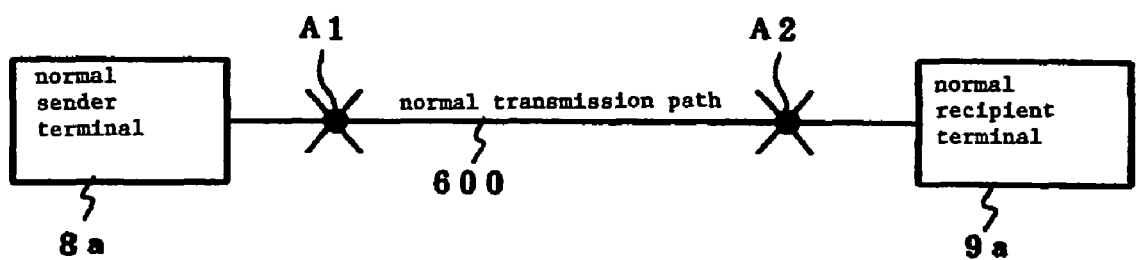
FIG. 2A is a block diagram of a conventional random number generating and sharing system with a transmission path between a normal sender terminal and a normal recipient terminal being cut off.
Figure 2B:
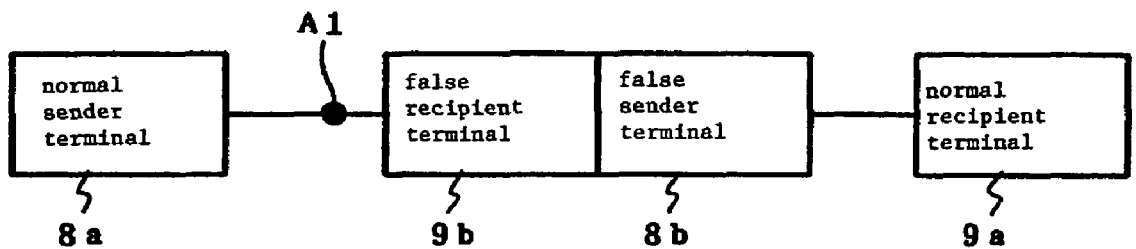
FIG. 2B is a block diagram of a conventional random number generating and sharing system with a false recipient terminal and a false sender terminal being connected between a normal sender terminal and a normal recipient terminal.

According to the present embodiment, part of the encryption keys stored in authentication memories 12, 22 is used for sender terminal 1 and recipient terminal 2 to authenticate each other for thereby detecting a connected false terminal or false terminals when a false recipient terminal is connected by a false transmission path (see FIG. 1) or a false recipient terminal and a false sender terminal are connected to the normal transmission path (see FIG. 2B). The encryption keys that have been used for authentication are discarded and will not be used again for authentication to increase the safety of the mutual connection of the terminals.

Figure 5:
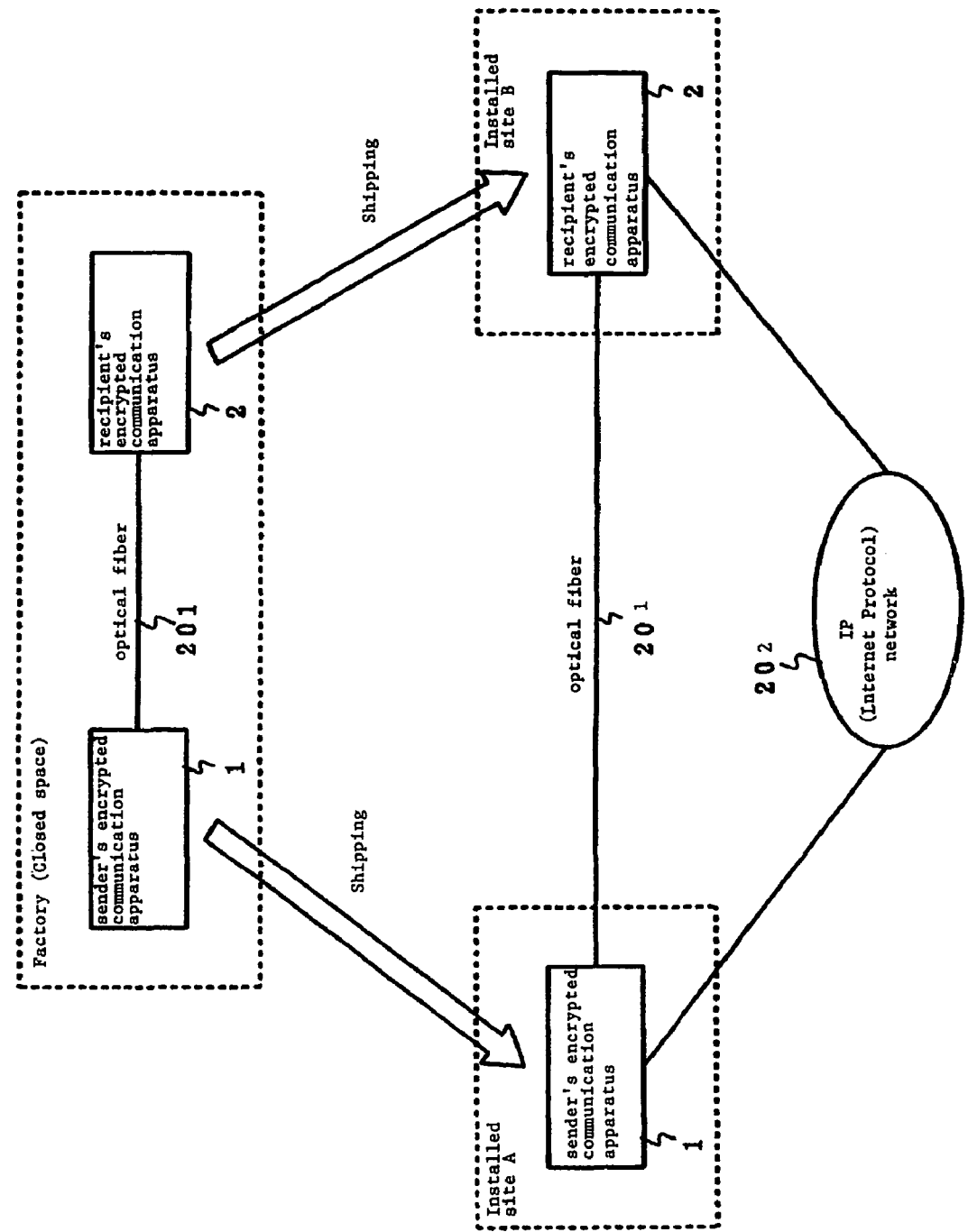
FIG. 5 is a block diagram of a random number generating and sharing system according to a second embodiment of the present invention.

FIG. 5 shows in block form a random number generating and sharing system according to a second embodiment of the present invention. With the random number generating and sharing system according to the second embodiment, as shown in FIG. 5, when sender terminal 1 and recipient terminal 2 are shipped from the factory, encryption keys are generated according the same process as with the first embodiment in the factory or a space where the generation and storage of encryption keys can be managed, and stored in authentication memories 12, 22. Then, after sender terminal 1 and recipient terminal 2 are shipped from the factory, they are installed in respective sites A, B and interconnected by optical fiber 201. Thereafter, sender terminal 1 and recipient terminal 2 are authenticated using the encryption keys stored in authentication memories 12, 22. Authentication memories 12, 22 store at least the encryption keys to be used for the first authentication process.

According to the present embodiment, even if sender terminal 1 and recipient terminal 2 that are installed in respective sites A, B cannot be inter-connected by optical fiber 201, encrypted communications can be performed between sender terminal 1 and recipient terminal 2 using encryption keys stored in encryption key memories 13, 23 over IP (Internet Protocol) network 202. In this case, authentication memories 12, 22 may store general-purpose encryption keys that can be used for both authentication and encrypted communications.

Since encryption keys for authentication cannot be generated over IP network 202, authentication memories 12, 22 store as many generated encryption keys for authentication as can be used for a certain period of time, e.g., half a year or a full year. When all the stored encryption keys are used up, sender terminal 1 and recipient terminal 2 are returned to the factory or the space where the generation and storage of encryption keys can be managed, and encryption keys are generated and stored in authentication memories 12, 22. Alternatively, only in authentication memories 12, 22 may be replaced with those storing new encryption keys.

Figure 6:
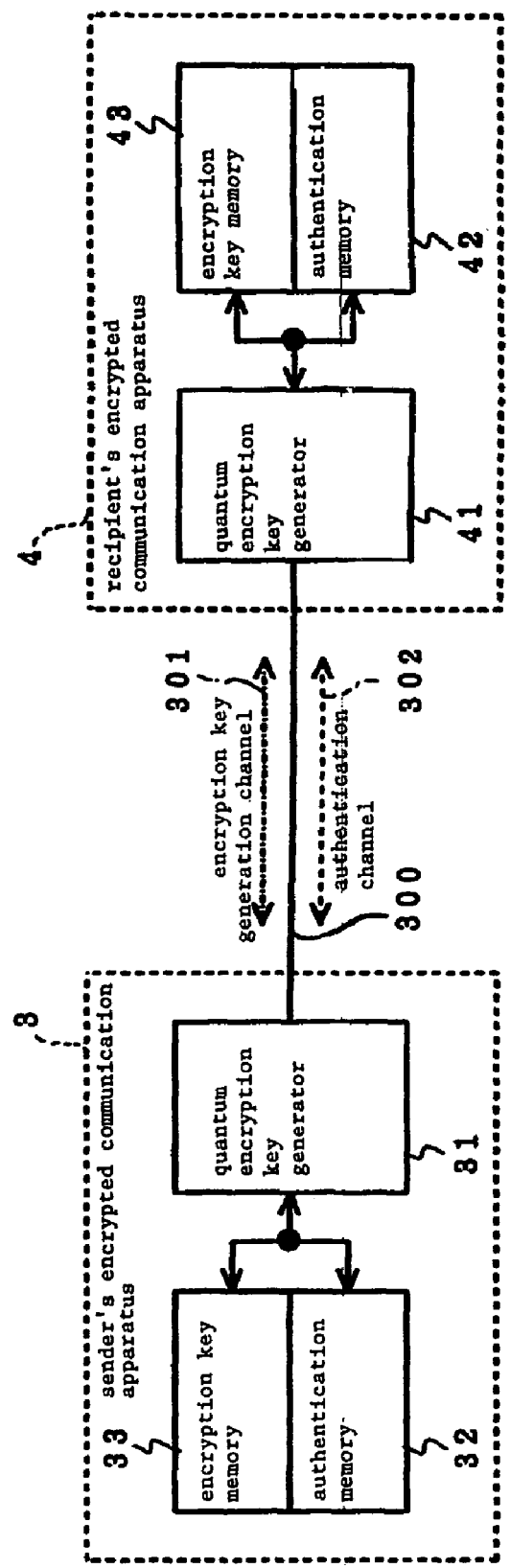
FIG. 6 is a block diagram of a random number generating and sharing system according to a third embodiment of the present invention.

FIG. 6 shows in block form a random number generating and sharing system according to a third embodiment of the present invention. As shown in FIG. 6, the random number generating and sharing system according to the third embodiment comprises sender terminal 3 and recipient terminal 4. Sender terminal 3 comprises quantum encryption key generator 31, authentication memory 32, and encryption key memory 33. Recipient terminal 4 comprises quantum encryption key generator 41, authentication memory 42, and encryption key memory 43.

Sender terminal 3 and recipient terminal 4 are connected to each other by encryption key generation/transmission path 300. Encryption key generation/transmission path 300. Encryption key generation/transmission path 300 comprises encryption key generation channel 301 and authentication channel 302.

Figure 7:
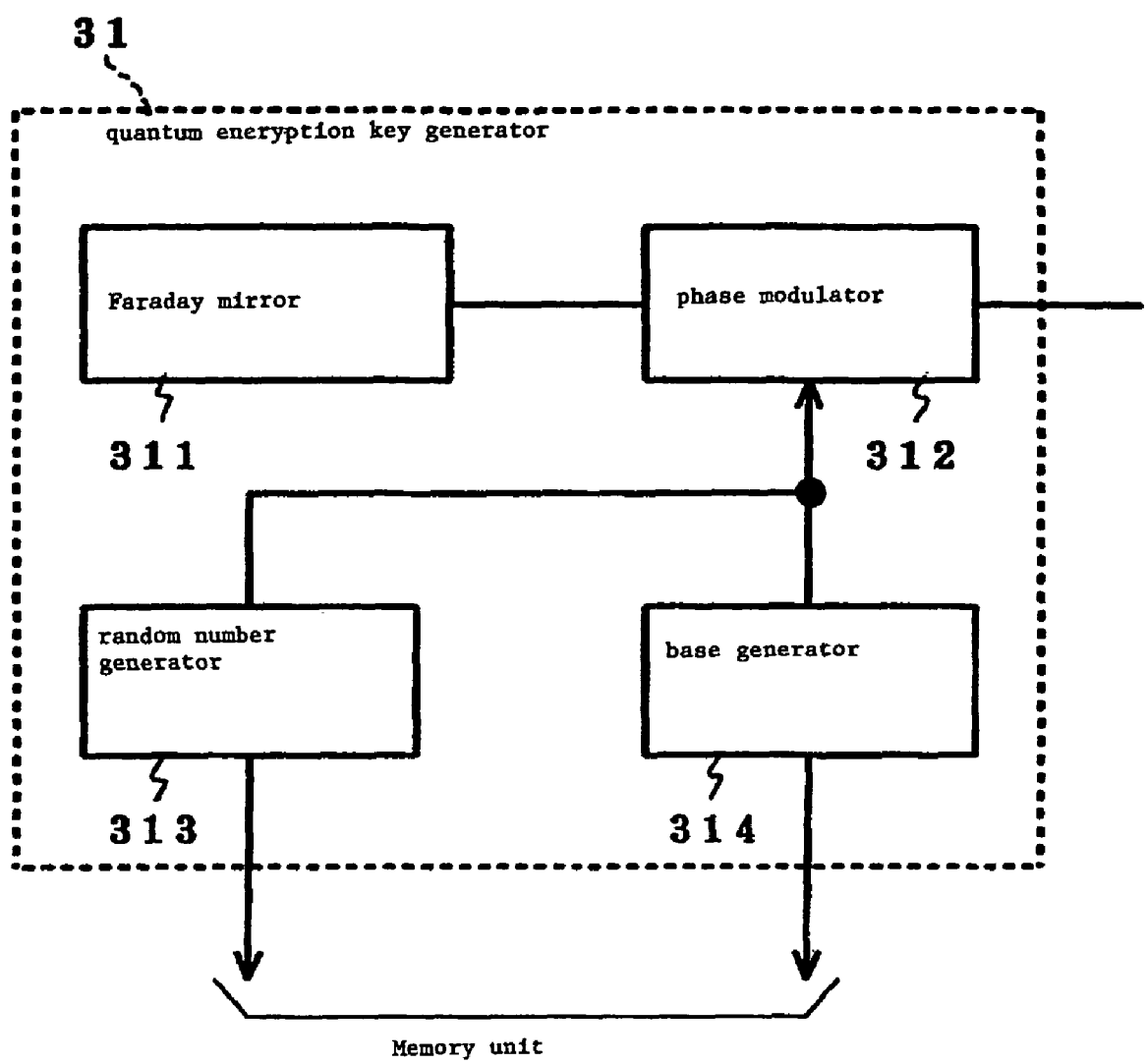
FIG. 7 is a block diagram of a quantum encryption key generator in a sender terminal of the random number generating and sharing system shown in FIG. 6.
Figure 8:
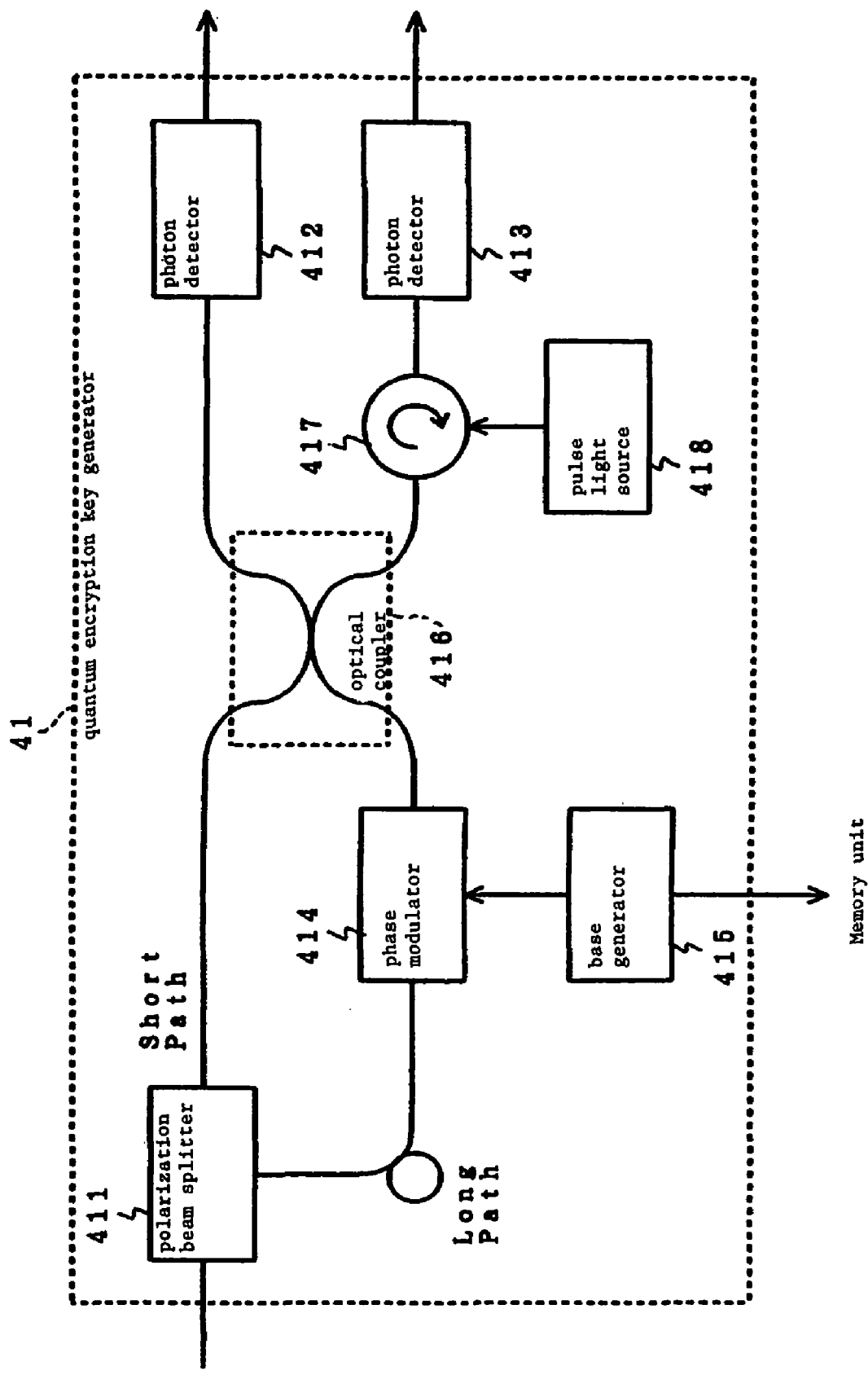
FIG. 8 is a block diagram of a quantum encryption key generator in a recipient terminal of the random number generating and sharing system shown in FIG. 6.

FIG. 7 shows in block form quantum encryption key generator 31 in sender terminal 3 of the random number generating and sharing system shown in FIG. 6. FIG. 8 shows in block form quantum encryption key generator 41 in recipient terminal 4 of the random number generating and sharing system shown in FIG. 6.

As shown in FIG. 7, quantum encryption key generator 31 of sender terminal 3 is of a "plug & play" configuration, and comprises Faraday mirror 311, phase modulator 312, random number generator 313, and base generator 314.

As shown in FIG. 8, quantum encryption key generator 41 of recipient terminal 4 is also of a "plug & play" configuration, and comprises polarization beam splitter 411, photon detectors 412, 413, phase modulator 414, base generator 415, optical coupler 416, optical circulator 417, and pulse light source 418.

When sender terminal 3 and recipient terminal 4 are connected to each other, they authenticates each other using encryption keys stored in authentication memories 32, 42, as with the first embodiment described above.

Operation of the random number generating and sharing system according to the third embodiment will be described below with reference to FIGS. 6 through 8.

Quantum encryption key generators 31, 41 of sender terminal 3 and recipient terminal 4 autonomously generate keys for encryption. Encryption key memories 33, 43 store the generated encryption keys. Authentication memories 32, 42 store part of the generated encryption keys. The encryption keys are generated through encryption key generation channel 301 according to the "plug & play" quantum encryption key generation technology and the BB84 (Bennett Brassard 84) protocol.

Figure 9:
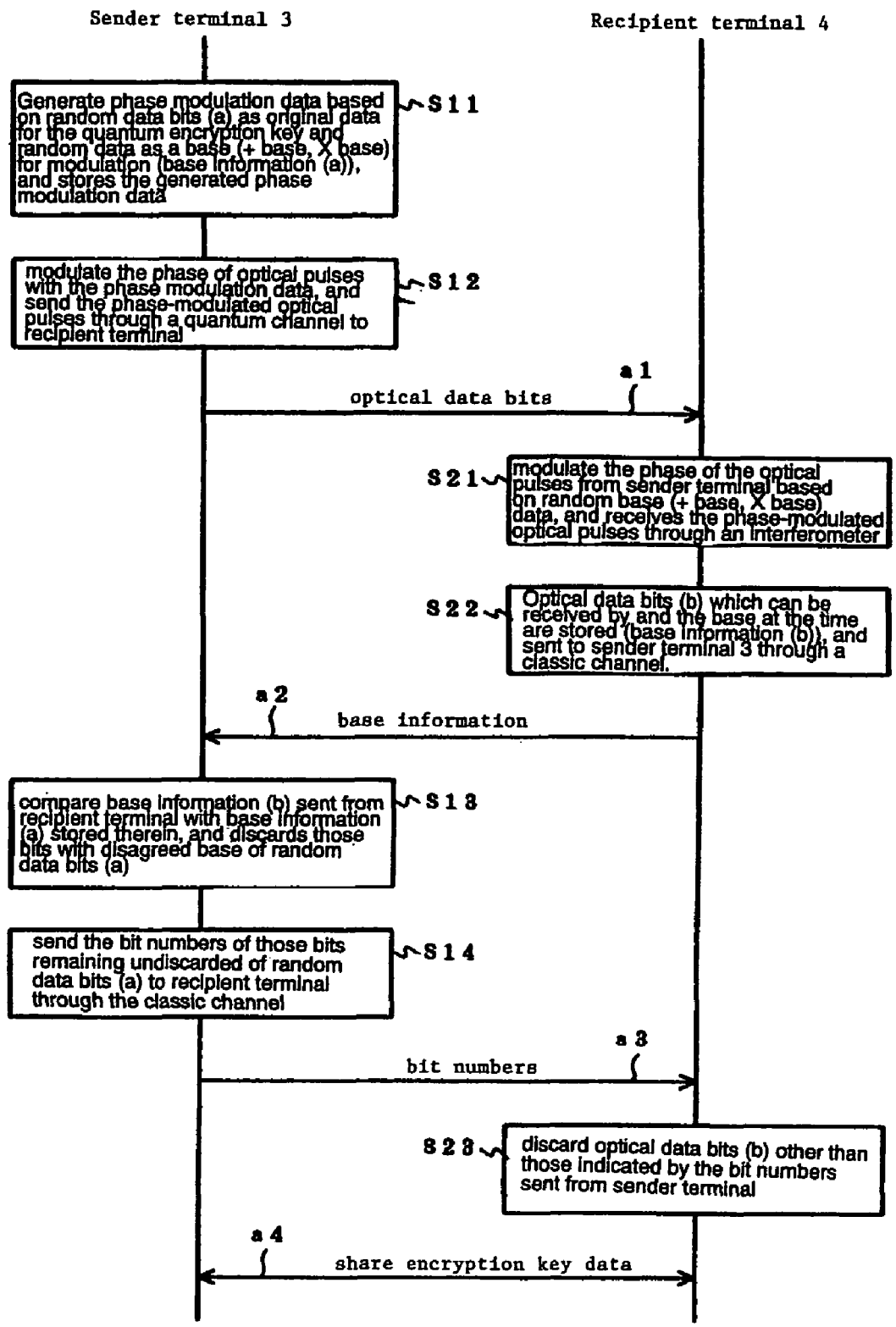
FIG. 9 is a flowchart of a quantum encryption key generating sequence according to the third embodiment.

FIG. 9 shows a quantum encryption key generating sequence according to the third embodiment. The quantum encryption key generating sequence according to the third embodiment will be described below with reference to FIGS. 6 and 9.

In the quantum encryption key generating sequence, the term "quantum channel" refers to a communication channel where the optical power sent from sender terminal 3 to recipient terminal 4 is of a weak level of 1 photon/bit or lower, and the term "classic channel" to a communication channel where the optical power sent from sender terminal 3 to recipient terminal 4 is in an ordinary optical power range.

A quantum encryption key is generated as follows:

(1) Sender terminal 3 generates phase modulation data based on random data bits (a) as original data for the quantum encryption key and random data as a base (+base, X base) for modulation (base information (a)), and stores the generated phase modulation data in step S11 in FIG. 9.

(2) Sender terminal 3 modulates the phase of optical pulses with the phase modulation data, and sends the phase-modulated optical pulses through a quantum channel to recipient terminal 4 in step S12 and branch a1.

(3) Recipient terminal 4 modulates the phase of the optical pulses from sender terminal 3 based on random base (+base, X base) data, and receives the phase-modulated optical pulses through an interferometer in step S21.

(4) Optical data bits (b) which can be received by recipient terminal 4 and the base at the time are stored (base information (b)), and sent to sender terminal 3 through a classic channel in step S22 and branch a2.

(5) Sender terminal 3 compares base information (b) sent from recipient terminal 4 with base information (a) stored therein, and discards those bits with disagreed base of random data bits (a) in step S13.

(6) Sender terminal 3 then sends the bit numbers of those bits remaining undiscarded of random data bits (a) to recipient terminal 4 through the classic channel in step S14 and branch a3.

(7) Recipient terminal 4 discards optical data bits (b) other than those indicated by the bit numbers sent from sender terminal 3 in step S23.

(8) Sender terminal 3 and recipient terminal 4 share encryption key data in branch a4.

According to the third embodiment, as with the first embodiment, the keys stored in authentication memories 32, 42 are used for sender terminal 3 and recipient terminal 4 to authenticate each other through authentication channel 302 when sender terminal 3 and recipient terminal 4 are interconnected. Specifically, sender terminal 3 and recipient terminal 4 are mutually authenticated by comparing all data of keys stored in authentication memories 32, 42 or keys generated at times in the past. If the compared key data do not agree with each other, then each of sender terminal 3 and recipient terminal 4 does not regard the other as a normal connected party.

Figure 10:
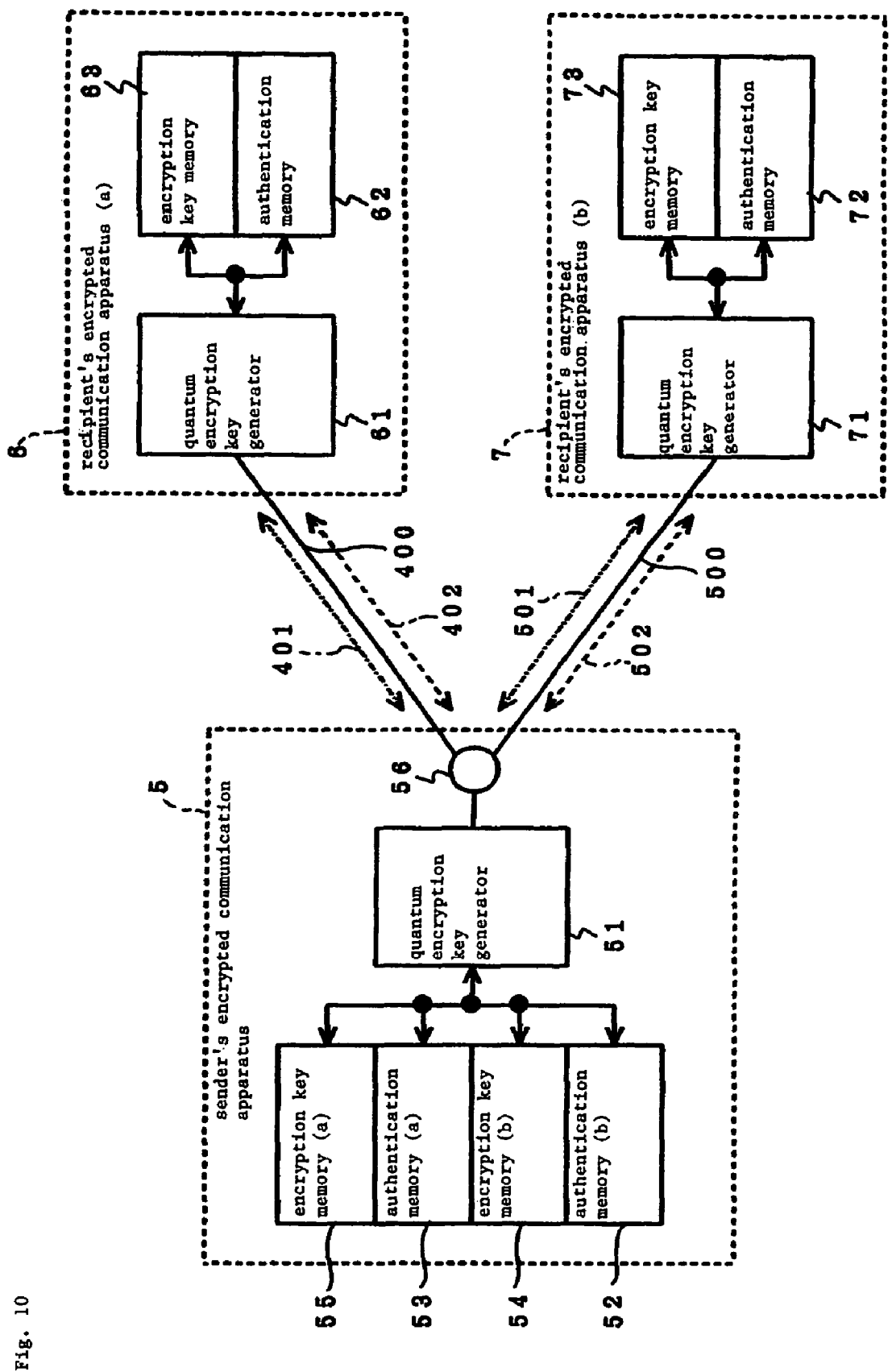
FIG. 10 is a block diagram of a random number generating and sharing system according to a fourth embodiment of the present invention.

FIG. 10 shows in block form a random number generating and sharing system according to a fourth embodiment of the present invention. As shown in FIG. 10, the random number generating and sharing system according to the fourth embodiment comprises sender terminal 5 and recipient terminals (a, b) 6, 7. In FIG. 10, sender terminal 5 and recipient terminals (a, b) 6, 7 are shown as having only encryption key generators 51, 61, 71, authentication memories 52, 53, 62, 72, and encryption key memories 54, 55, 63, 73.

The random number generating and sharing system according to the fourth embodiment employs the quantum encryption key generation technology for generating encryption keys as with the random number generating and sharing system according to the first embodiment. The random number generating and sharing system shown in FIG. 10 has a 1:2 connection configuration where sender terminal 5 is connected to recipient terminals (a, b) 6, 7 through encryption key generation/transmission paths 400, 500.

Sender terminal 5 comprises encryption key generator 51, authentication memory (a) 52 and encryption key memory (a) 54 for storing keys generated between sender terminal 5 and recipient terminal 6, and authentication memory (b) 53 and encryption key memory (b) 55 for storing keys generated between sender terminal 5 and recipient terminal 7.

Recipient terminal (a) 6 comprises quantum encryption key generator 61, authentication memory 62, and encryption key memory 63. Recipient terminal (b) 7 comprises quantum encryption key generator 71, authentication memory 72, and encryption key memory 73.

Sender terminal 5 and recipient terminal (a) 6 are connected to each other by encryption key generation/transmission path 400. Encryption key generation/transmission path 400 comprises encryption key generation channel 401 and authentication channel 402. Similarly, sender terminal 5 and recipient terminal (b) 7 are connected to each other by encryption key generation/transmission path 500. Encryption key generation/transmission path 500 comprises encryption key generation channel 501 and authentication channel 502.

Each of encryption key generators 51, 61, 71 is of a "plug & play" configuration as with the second embodiment.

Figure 11:
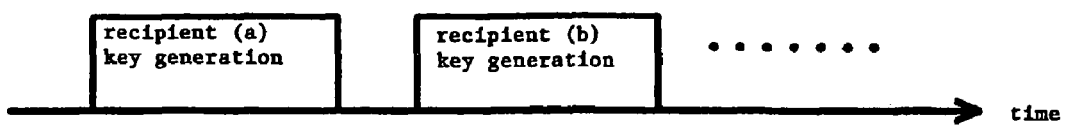
FIG. 11 is a timing chart of the operation timing of the random number generating and sharing system according to the fourth embodiment.

FIG. 11 shows the operation timing of the random number generating and sharing system according to the fourth embodiment. The operation timing of the random number generating and sharing system according to the fourth embodiment will be described below with reference to FIGS. 10 and 11.

As shown in FIG. 11, sender terminal 5 is connected to recipient terminals (a, b) 6, 7 generate encryption keys based on a time-division system according to a key generation process in each of time slots that are assigned. The key generation process in each of the time slots is identical to the key generation process according to the second embodiment. Furthermore, when recipient terminals (a, b) 6, 7 are connected to sender terminal 5, they authenticate each other in the same manner as with the second embodiment.

In the above description, the quantum encryption key generators are of the "plug & play" configuration. However, it may be of a configuration using a PLC (Planar Light Circuit). In addition, the encryption key generating protocol, which has been described above as the BB84 protocol, may be the E91 (Ekert 91) protocol or the B92 (Bennett 92) protocol.

According to the fourth embodiment described above, the random number generating and sharing system is shown as having a 1:2 connection configuration. However, it may have a 1:many (3 or more) connection configuration, and may have a ring or bus topology.

Insofar as the functions described above can be performed, any desired encryption key generating systems, encryption key generating protocols, and connected configurations may be selected freely as desired in the present invention. The details described and illustrated above should not be interpreted as limiting the present invention.

The present invention is applicable to the field of art which requires highly safe communications, such as secret communication systems for performing transactions through networks, secret communication systems for transmitting important information in government offices, or the like.

While preferred embodiments of the present invention have been described using specific terms, such description is for illustrative purposes only, and it is to be understood that changes and variations may be made without departing from the spirit or scope of the following claims.

What is claimed is:

1. A random number generating and sharing system for generating and sharing a random number between a sender terminal and a recipient terminal, comprising:

a first generating means, which generates a first random number for said sender terminal;

a second generating means, which generates a second random number for said recipient terminal, wherein said second random number is base information;

a third generating means, which generates a third random number for said sender terminal, wherein said third random number is base information;

generating means which generates a fourth random number based on said second and third random numbers wherein said fourth random number is a part of said first random numbers;

holding means for holding said first to fourth random numbers;

sending means for sharing said second or third random number with said sender terminal and said recipient terminal;

generating and sharing means for generating and sharing encryption key data based on said first to fourth random numbers, holding means for holding said encryption key data, wherein if said sender terminal and said recipient terminal which have been disconnected are connected again to each other, each of said sender terminal and said recipient terminal authenticate each other by confirming a part of said encryption key data held by said holding means for holding said encryption key data, and wherein said second or third random number that is shared by the sending means is shared between said sender terminal and said recipient terminal prior to said sender terminal and said recipient terminal being disconnected.

2. A random number generating and sharing system according to claim 1, further comprising a quantum encryption key distribution system for generating and sharing said encryption key data that is generated and shared by the generating and sharing means.

3. The random number generating and sharing system according to claim 2, wherein said quantum encryption key distribution system comprises a "plug & play" system.

4. The random number generating and sharing system according to claim 2, wherein said quantum encryption key distribution system generates and shares said encryption key data shared by the generating and sharing means according to BB84 (Bennett Brassard 84) protocol.

5. The random number generating and sharing system according to claim 1, wherein the fourth random number held by said holding means is discarded after each of said sender terminal and said recipient terminal has confirmed part of the fourth random number.

6. The random number generating and sharing system according to claim 1, wherein after said fourth random number is held by said holding means, said sender terminal and said recipient terminal are installed at a spaced interval represented by at least a predetermined distance from each other, and thereafter each of said sender terminal and said recipient terminal confirms the part of said encryption key data held by said holding means for holding said encryption key data.

7. A random number generating and sharing system according to claim 1, wherein the random number held by said holding means can be used when each of said sender terminal and said recipient terminal confirms the part of said encryption key data held by said holding means for holding said encryption key data, and also when said sender terminal and said recipient terminal perform encrypted communications with each other.

8. The random number generating and sharing system according to claim 1, wherein random numbers shared by said sender terminal are shared between itself and a plurality of recipient terminals.

9. The random number generating and sharing system according to claim 2, wherein said quantum encryption key distribution system includes:
the first generating means which generates the first random number;
the third generating means which generates the third random number;
a faraday mirror; and
a phase modulator which modulates said first and third random numbers using said generated base as a base for the modulation.

10. The random number generating and sharing system according to claim 2, wherein said quantum encryption key distribution system includes:
the second generating means which generates a base;
a polarization beam splitter which splits optical pulses received from said sender terminal into short path optical pulses and long path optical pulses; and
a phase modulator which modulates a phase of the long path optical pulses, based on said generated base.

11. A random number generating and sharing system for generating and sharing a random number between a sender terminal and a recipient terminal and using said random number as an encryption key, comprising:
a first generating means, which generates a first random number for said sender terminal;
a second generating means, which generates a second random number for said recipient terminal, wherein said second random number is base information;
a third generating means, which generates a third random number for said sender terminal, wherein said third random number is base information;
generating means which generates a fourth random number based on said second and third random numbers, wherein said fourth random number is part of said first random number;
holding means for holding said first to fourth random numbers;
sending means for sharing said second or third random numbers with said sender terminal and said recipient terminal as an encryption key;
generating and sharing means for generating and sharing encryption key data based on said first to fourth random numbers,
holding means for holding said encryption key data,
wherein if said sender terminal and said recipient terminal which have been disconnected are connected again to each other, each of said sender terminal and said recipient terminal authenticate each other by confirming a part of said encryption key data held by said holding means for holding said encryption key data,
wherein if each of said sender terminal and said recipient terminal confirm the fourth random number held by the holding means, the generation of said encryption key data is resumed, and
wherein said second and third random number that are shared by the sending means are shared between said sender terminal and said recipient terminal prior to said sender terminal and said recipient terminal being disconnected.

12. The random number generating and sharing system according to claim 11, further comprising a quantum encryption key distribution system for generating and sharing said encryption key data.

13. The random number generating and sharing system according to claim 12, wherein said quantum encryption key distribution system comprises a "plug & play" system.

14. The random number generating and sharing system according to claim 12, wherein said quantum encryption key distribution system generates and shares said encryption key data according to BB84 (Bennett Brassard 84) protocol.

15. The random number generating and sharing system according to claim 11, wherein said first to fourth random numbers held by said holding means are discarded after each of said sender terminal and said recipient terminal has confirmed the part of said encryption key data held by said holding means for holding said encryption data.

16. The random number generating and sharing system according to claim 11, wherein after the fourth random number is held by said holding means, said sender terminal and said recipient terminal are installed at a spaced interval represented by at least a predetermined distance from each other, and thereafter each of said sender terminal and said recipient terminal confirms the part of said encryption key data held by said holding means for holding said encryption key data.

17. The random number generating and sharing system according to claim 11, wherein the first to fourth random numbers held by said holding means can be used when each of said sender terminal and said recipient terminal confirms part of the fourth random number, and also when said sender terminal and said recipient terminal perform encrypted communications with each other.

18. The random number generating and sharing system according to claim 11, wherein said sender terminal shares encryption keys between itself and a plurality of recipient terminals.

19. An encrypted communication apparatus for generating and sharing a random number between a first terminal and a second terminal and using the random number as an encryption key for encrypted communications, the first comprising:
 a first generating means, which generates a first random number for said first terminal;
 receiving means at said first terminal which receives a second random number from said second terminal, wherein said second random number is base information;
 a third generating means, which generates a third random number for said first terminal, wherein said third random number is base information;
 generating means which generates a fourth random number based on said second and third random numbers, wherein said fourth random number is part of said first random number;
 holding means for holding said first to fourth random numbers;
 sending means for sharing said second or third random number with said first and second terminals as encryption keys;
 generating and sharing means for generating and sharing encryption key data based on said first to fourth random numbers,
 holding means for holding said encryption key data,
 wherein if said first terminal and said second terminal which have been disconnected are connected again to each other, said first terminal and said second terminal authenticate each other by confirming a part of said encryption key data;
 pausing or stopping the generation of first to fourth random numbers,
 wherein if each of said first terminal and said second terminal confirms the fourth random number, the generation of said first to fourth random numbers is resumed, and
 wherein said second or third random number that is shared by the sending means are shared between said first terminal and said second terminal prior to said first terminal and said second terminal being disconnected.

20. The encrypted communication apparatus according to claim 19, further comprising a quantum encryption key distribution system for generating and sharing said encryption key data.

21. The encrypted communication apparatus according to claim 20, wherein said quantum encryption key distribution system comprises a "plug & play" system.

22. The encrypted communication apparatus according to claim 20, wherein said quantum encryption key distribution system generates and shares said encryption key data according to BB84 (Bennett Brassard 84) protocol.

23. The encrypted communication apparatus according to claim 19, wherein the fourth random number held by said holding means is discarded after each of said first terminal and said second terminal has confirmed the part of said encryption key data.

24. The encrypted communication apparatus according to claim 19, wherein after the fourth random number is held by said holding means, said first terminal is installed at a spaced interval from said second terminal, represented by at least a predetermined distance, and thereafter each of said first terminal and said second terminal confirms the part of said encryption key data held by said holding means for holding said encryption key data.

25. The encrypted communication apparatus according to claim 19, wherein the first to fourth random numbers held by said holding means can be used when each of said first terminal and said second terminal confirms part of the fourth random number, and also when said first terminal and said recipient terminal performs encrypted communications with each other.

26. The encrypted communication apparatus according to claim 19, wherein said first terminal shares random numbers as encryption key data between itself and a plurality of second terminals.

27. A method of generating and sharing a random number between a sender terminal and a recipient terminal, the method comprising:
 generating a first random number for said sender terminal;
 generating a second random number for said recipient terminal, wherein said second random number is base information;
 sharing said first random number with said recipient terminal, and sharing said second random number with said sender terminal;
 generating a third random number for said recipient sender terminal, wherein said third random number is base information;
 generating a fourth random number based on said second and third random number, wherein said fourth random number is a part of said first random number;
 holding said first to fourth random numbers in a holding means for holding said first to fourth random numbers;
 generating and sharing encryption key data based on said first to fourth random numbers;
 holding said encryption key data in a holding means for holding said encryption key data,
 authenticating said sender terminal and said recipient terminal by confirming a part of said encryption key data held by said holding means for holding said encryption key data if said sender terminal and said recipient terminal which have been disconnected are connected again to each other,
 wherein said second or third random number is shared between said sender terminal and said recipient terminal prior to said sender terminal and said recipient terminal being disconnected.

28. The method according to claim 27, wherein said second or third random number that is generated is generated and shared using a quantum encryption key distribution system.

29. The method according to claim 28, wherein said quantum encryption key distribution system comprises a "plug & play" system.

30. The method according to claim 28, wherein said quantum encryption key distribution system generates and shares said second or third random number according to BB84 (Bennett Brassard 84) protocol.

31. The method according to claim 27, wherein said fourth random number held by said holding means is discarded after each of said sender terminal and said recipient terminal has confirmed the part of said encryption key data held by said holding means for holding said encryption key data.

32. The method according to claim 27, wherein after said fourth random number is held by said holding means, said sender terminal and said recipient terminal are installed at a spaced interval represented by at least a predetermined distance from each other, and thereafter each of said sender terminal and said recipient terminal confirms the part of said encryption key data held by said holding means for holding said encryption key data.

33. The method according to claim 27, wherein random numbers held by said holding means can be used when each of said sender terminal and said recipient terminal confirms the part of said encryption key data held by said holding means for holding said encryption key data, and also when said sender terminal and said recipient terminal perform encrypted communications with each other.

34. The method according to claim 27, wherein said second or third random number is shared between the sender terminal and a plurality of recipient terminals.

35. A method of generating and sharing a random number between a sender terminal and a recipient terminal and using said random number as an encryption key, the method comprising:
generating a first random number for said sender terminal;
generating a second random number for said recipient terminal, where said second random number is base information;
generating a third random number for said sender terminal, wherein said third random number is base information;
generating a fourth random number based on said second and third random numbers, wherein said fourth random number is part of said first random number;
holding said first to fourth random numbers in a holding means;
sharing said second or third random number with said recipient terminal as an encryption key;
generating and sharing encryption key data based on said first to fourth random numbers,
holding said encryption key data in a holding means for holding said encryption key data,
authenticating said sender terminal and said recipient terminal with each other by confirming a part of said encryption key data held by said holding means for holding said encryption key data with each of said sender terminal and said recipient terminal, if said sender terminal and said recipient terminal which have been disconnected are connected again to each other;
pausing or stopping the generation of the first to fourth random numbers, and
resuming the generating of the first to fourth random number, if the fourth random number held by said holding means is confirmed by each of said sender terminal and said recipient terminal,
wherein said second or third random number is shared between said sender terminal and said recipient terminal prior to said sender terminal and said recipient terminal being disconnected.

36. The method according to claim 35, wherein said encryption key data is generated and shared using a quantum encryption key distribution system.

37. The method according to claim 36, wherein said quantum encryption key distribution system comprises a "plug & play" system.

38. The method according to claim 36, wherein said quantum encryption key distribution system generates and shares said encryption key data according to BB84 (Bennett Brassard 84) protocol.

39. The method according to claim 35, wherein said fourth random number held by said holding means is discarded after each of said sender terminal and said recipient terminal has confirmed the part of said encryption key data held by the holding means for holding said encryption key data.

40. The method according to claim 35, wherein after said fourth random number is held by said holding means, said sender terminal and said recipient terminal are installed at a spaced interval represented by at least a predetermined distance from each other, and thereafter each of said sender terminal and said recipient terminal confirms the part of said encryption key data, said second random number held by said holding means.

41. The method according to claim 35, wherein said random number held by said holding means can be used when each of said sender terminal and said recipient terminal confirms the part of said encryption key data held by the holding means for holding said encryption key data, and also when said sender terminal and said recipient terminal perform encrypted communications with each other.

42. The method according to claim 35, wherein encryption key data is shared between the sender terminal and a plurality of recipient terminals.

* * * * *